April 18, 1961
J. SZYDLOWSKI
2,980,175
DEVICE FOR CONTROLLING THE ACCELERATION
TIME OF TURBOJET ENGINES
Filed July 25, 1955
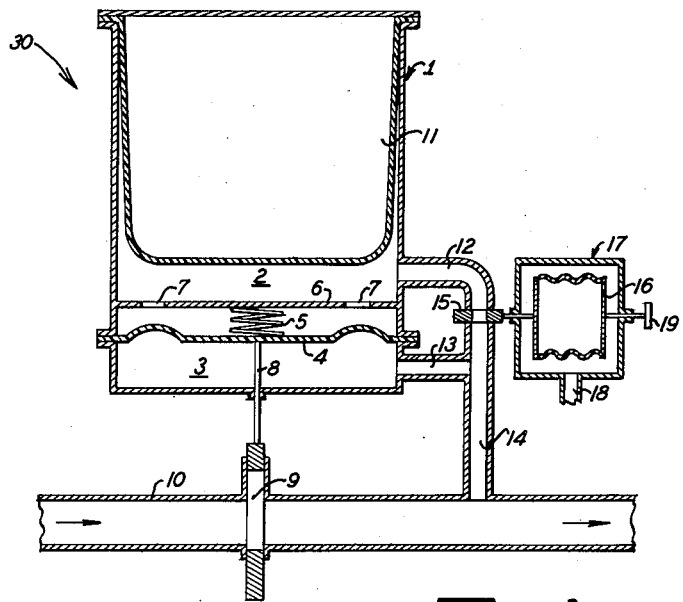
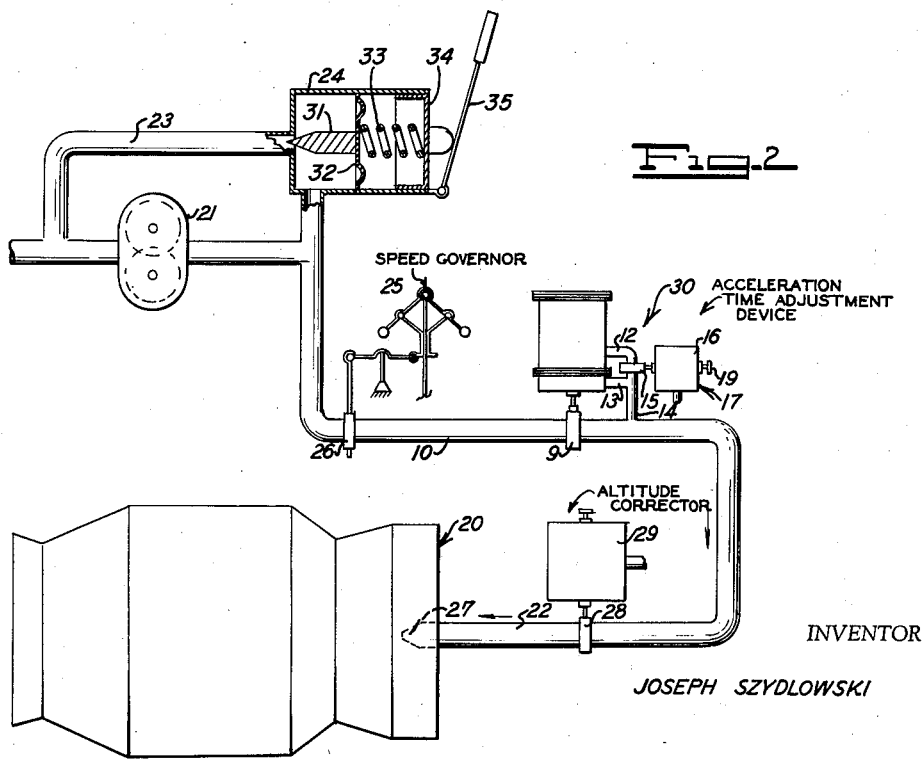
INVENTOR
JOSEPH SZYDLOWSKI United States Patent Office 2,980,175
Patented Apr. 18, 1961

2,980,175
DEVICE FOR CONTROLLING THE ACCELERATION TIME OF TURBOJET ENGINES

Joseph Szydlowski, Usine Turbomeca, Bordes, Basses-Pyrenees, France

Filed July 25, 1955, Ser. No. 524,130

Claims priority, application France Aug. 4, 1954

5 Claims. (Cl. 158—36.4)

The present invention relates to a device for controlling the acceleration time of turbojet engines of the type used on aircraft under the action of any increase in the fuel supply pressure, more particularly, independently of the velocity at which the pilot operates the throttle or like control lever of the turbojet engine or engines.

For properly flying an aircraft equipped with turbojets an important requirement is to accelerate the engines in a minimum of time. However, if the throttle control lever is operated too quickly in the acceleration direction, the so-called pumping phenomena takes place inevitably in the compressors equipping the turbojets; these phenomena are absolutely inconsistent with the adequate behaviour of the engine and are most likely, under certain circumstances, to stall the engine or extinguish the flame in its combustion chamber or chambers.

The minimum acceleration time varies of course for each type of turbojet and is also a function of the aircraft speed and flying altitude. Flying experience teaches that it is not possible to require a pilot of a turbojet aircraft— considering the great number of manoeuvers he must accomplish within relatively short time periods, especially under certain conditions of flight—to actuate the throttle lever progressively within predetermined time periods. Consequently, it is also impossible to require him to vary this actuation time as a function of the altitude and flying speed. This has led aircraft designers to introduce acceleration systems independent of the speed at which the throttle lever is actuated by the pilot.

Acceleration controlling devices of this general character have already been used on turbojet aircraft and comprise, as a rule, a device adapted to regulate the acceleration time either mechanically through a dash-pot mounted on the control lever or through control accelerometers. However, this last-mentioned solution implies necessarily the use of cumbersome, complicated and heavy equipment.

To obtain acceleration times as short as possible for a given turbojet engine, it is the essential object of this invention to provide a method of controlling the acceleration time of a turbojet engine whereby any instantaneous increase in the fuel supply pressure occurring in the turbojet fuel feed line (between the fuel pump and the engine feed nozzle) is instantaneously stored outside of said line upstream of its part connected to said nozzle, then subsequently restored in said part of the fuel feed line with a predetermined time-lag and according to a predetermined law, if the duration of said increase in the fuel supply pressure is greater than that of said time-lag.

Moreover, this invention is concerned with a device for controlling the acceleration time of a turbojet engine and comprises means adapted, when an instantaneous overpressure builds up in the fuel feed line to maintain the fuel output in the part of said line which is connected to the engine feed nozzle at the value existing before said increase occurs, and comprises means adapted progressively to restore this increase in the fuel supply pressure throughout this part of the feed line during a predetermined time period and according to a predetermined law in order progressively to increase the fuel output through said part of the feed line. The device for restoring the overpressure throughout the feed line is operative either during a predetermined and fixed time period or during a time period which varies with the aircraft flying altitude and speed, due to the provision of means responsive to the altitude and speed, when the turbojet engine is mounted on an aircraft.

According to an advantageous embodiment of the invention, the acceleration time adjustment device comprises a container divided into two chambers separated by a flexible diaphragm connected directly or indirectly through one of said chambers to an adjustable valve valve mounted in the fuel feed line, the chamber which does not contain the operative connection between the diaphragm and the valve acting as a housing for another deformable wall without connection with said valve and responsive to pressure variations, these chambers being interconnected through a by-pass connected in turn to the fuel feed line downstream of the aforesaid valve and having an adjustable restricted flow passage controlling the fluid flow through this by-pass. The other deformable wall of the second chamber consists either of an air-filled resilient bladder, the air pressure in the bladder being lower, when there is no fuel supply, than the minimum fuel pressure necessary for operating the engine. Preferably, the adjustable restricted flow passage in the by-pass is either of the constant section passage type, or provided with means whereby the passage section is adjustable through a control device responsive to one or more parameters, such as a barostatic diaphragm responsive to the total pressure to make due allowance for the aircraft speed.

The accompanying drawing forming part of this specification illustrates diagrammatically, by way of example, the manner in which the invention may be carried out in practice and the specific features thereof; in the drawing:

Fig. 1 is a schematic sectional view showing a typical embodiment of a device for controlling the acceleration time of a turbojet designed in accordance with the teachings of the present invention; and, Fig. 2 is a complete view illustrating the incorporation of the device of Fig. 1 in a fuel supply system for turbojet engines comprising a barostatic correction.

The acceleration time adjustment device illustrated in Fig. 1 comprises a container 1 having two chambers 2, 3 formed therein and separated by a resilient diaphragm 4. This diaphragm is operatively connected to a spring 5 secured in turn to a wall 6 in chamber 2 and having a plurality of apertures 7 formed therethrough, so as to provide a fluid connection between the compartments formed on either side of this wall. On the other hand, the diaphragm 4 is connected directly through a rod 8 to a gate valve 9 mounted in the turbojet fuel-feed line 10 between the fuel pump 21 and the engine feed nozzle 27. Besides, a sealed resilient bladder 11 filled with air is located in the chamber 2.

Both chambers 2, 3 communicate with the aforesaid line 10 downstream of the valve 9 through a by-pass comprising one branch pipe 12 leading from chamber 2, another branch pipe 13 leading from the other chamber 3 and a third branch pipe 14 interconnecting the first and second branch pipes 12, 13 and leading to the fuel feed line 10. In the branch pipe 12 between the chamber 2 and pipe 13, there is a variable area orifice 15 which is controlled by a barostatic diaphragm or bellows 16 enclosed in a housing 17 to which the total pressure is applied through a duct 18 to allow for the aircraft speed.

Moreover, this diaphragm 16 is provided with an adjustment knob or button 19.

The device described hereinabove operates as follows:

When the aircraft pilot wishes to accelerate the turbojet engine he actuates the throttle lever (not shown) in the opening direction at any desired speed, and consequently, an instantaneous increasing $\Delta_p$ in the fuel supply pressure builds up in the main feed line 10. As this increasing in the fuel supply pressure is transmitted through the by-pass branch pipe 13 to the diaphragm 4 in chamber 3, the spring 5 is compressed and the gate valve 9 connected thereto is moved to a partly closed position whereby the excess pressure in the part of the feed line 10 which is connected to the engine nozzle is limited. At the same time, due to the presence of the adjustable restricted flow passage 15 in the branch pipe 12 this increasing $\Delta_p$ in the fuel supply pressure builds up at a slower rate in the other chamber 2 so as to compress the air-filled sealed bladder 11 progressively. After a time $t$ corresponding to the actual acceleration time of the turbojet engine, the pressure balance between chambers 2 and 3 takes place and the gate valve 9 urged by the expanding spring 5 resumes its initial, i.e. open position.

On the other hand, any underpressure, resulting from a sudden deceleration demand which in turn results from the quick actuation of the throttle lever in the opposite direction by the pilot, will only tend to cause the already wide-open valve 9 to be pushed down by the diaphragm 4.

The adjustable restricted flow passage 15 controlled by the barostatic diaphragm or bellows 16 responsive to the total pressure makes it possible to vary the acceleration time according to the flying altitude and speed. At a high altitude the diaphragm 16 will actuate the adjustable restricted flow passage 15 so that the cross-sectional passage area of this jet will be reduced and the acceleration time increased accordingly. The position of jet 15 for setting the acceleration time may be readily adjusted by means of the finger knob 19.

Of course, the form and type of the adjustable restricted flow passage 15 may be designed to comply with any desired acceleration law as a function of altitude.

Fig. 2 illustrates a fuel supply system for turbojet engines incorporating the acceleration time controlling device of Fig. 1.

The turbojet engine 20 comprising a compressor, a combustion chamber of annular cross-section and a turbine, is fed from a fuel pump 21 through the main feed line 10. The suction and delivery sides of the pump are interconnected through a by-pass 23 having interposed therein an adjustable valve 24 adapted to regulate the fuel pressure in the main feed line, the excess fuel being returned to the pump inlet by the by-pass device 24 comprising a sliding valve 31 connected to a diaphragm 32 on which acts a spring 33 submitted by means of a cap 34 to the action of a manually operated control lever 35. A speed governor 25 responsive to the control lever is provided for setting the engine speed, this governor being operatively connected to a valve 26 mounted in the line 10.

On the other hand, upstream of the main nozzle 27 for injecting fuel into the turbojet engine, the line 10 has mounted therein—according to the conventional practice—a valve 28 controlled from an altitude correction device 29. The acceleration time adjustment device 30, according to this invention is mounted between the speed governor 25 and the aforesaid altitude correction device 29. This device 30 operates when the fuel pressure in the feed line 10 between valves 26 and 28 exceeds the air pressure in the bladder 11 of this device 30. Besides, the device 29 will permit of establishing in the fuel feed line 10, irrespective of the flying altitude and of the size of the injection nozzle 27, the desired pressure.

Of course, many modifications and alterations may be brought to the embodiment shown and described herein, without departing from the scope of the invention as set forth in the appended claims.

What I claim is:

1. In a liquid fuel supply system for engines, more particularly for turbojet engines, having a fuel feed line connecting a fuel pump to feed nozzles of the engine, the combination of an acceleration time controlling device comprising an adjustable valve in said feed line normally open for a stable flow of fuel therethrough, and an assembly connected to said feed line downstream of said adjustable valve and comprising a container, a flexible diaphragm defining two chambers in said container and one side of which is connected through one of said chambers to said adjustable valve, a perforated partition in said container disposed on the other side of said diaphragm, a spring disposed between said other side of the diaphragm and said partition, a deformable wall responsive to the pressure variations housed in said container remote from said diaphragm relatively to said partition, a by-pass interconnecting said two chambers and having a restricted flow passage, and a pipe interconnecting the part of said by-pass which is connected to the chamber through which passes the connection of the diaphragm with the adjustable valve and the feed line downstream of said valve.

2. In a liquid fuel supply system for turbojet engines mounted on aircraft, having a fuel feed line connecting a fuel pump and feed nozzles of the engine, the combination of an acceleration time controlling device comprising an adjustable valve in said feed line normally open for a stable flow of fuel therethrough, and an assembly connected to said feed line downstream of said adjustable valve and comprising a container, a flexible diaphragm defining two chambers in said container and one side of which is connected through one of said chambers to said adjustable valve, a perforated partition in said container disposed on the other side of said diaphragm, a spring disposed between said other side of the diaphragm and said partition, a resilient, sealed and air-filled bladder housed in said container remote from said diaphragm relatively to said partition, the air pressure in said bladder being lower when there is no fuel supply than the minimum fuel pressure built up in the feed line during the operation of the engine, a by-pass interconnecting said two chambers and having an adjustable restricted flow passage, means for adjusting said restricated flow passage, and a pipe interconnecting the part of said by-pass which is connected to the chamber through which passes the connection of the diaphragm with the adjustable valve and the feed line downstream of said valve.

3. A liquid fuel supply system, according to claim 2, wherein the means for adjusting the adjustable restricted flow passage comprises a control device responsive to at least one of the aircraft flying parameters and connected to said orifice.

4. A liquid fuel supply system, according to claim 1, wherein the deformable wall of the second chamber consists of a resilient, sealed and air-filled bladder the air pressure in said bladder being lower when there is no fuel supply than the minimum fuel pressure built up during the operation of the engine.

5. A liquid fuel supply system, according to claim 3, wherein the control device comprises a barostatic diaphragm responsive to the total pressure to allow for the aircraft speed.

References Cited in the file of this patent

UNITED STATES PATENTS

| 2,498,939 | Bobier | Feb. 28, 1950 |
| 2,683,485 | Harris | July 13, 1954 |
| 2,725,932 | Ballantyne et al. | Dec. 6, 1955 |
| 2,763,280 | Snyder | Sept. 18, 1956 |

FOREIGN PATENTS

| 481,383 | Canada | Feb. 26, 1952 |